(12) United States Patent
Chen et al.

(10) Patent No.: US 8,245,192 B1
(45) Date of Patent: Aug. 14, 2012

(54) INDEPENDENT SOFTWARE DEVELOPMENT ZONES

(75) Inventors: Anthony D. Chen, Orlando, FL (US);
Shane A. Lobo, Orlando, FL (US);
Robert D. Lumpkins, Norcross, GA (US); Matthew Mariscal, Winter Park, FL (US); Todd M. Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 939 days.

(21) Appl. No.: 12/273,535

(22) Filed: Nov. 18, 2008

(51) Int. Cl.
*G06F 9/44* (2006.01)

(52) U.S. Cl. .................. 717/122; 717/103; 717/106

(58) Field of Classification Search .................. None
See application file for complete search history.

(56) References Cited

U.S. PATENT DOCUMENTS

| | | | | |
|---|---|---|---|---|
| 5,893,119 | A * | 4/1999 | Squibb .................................. | 1/1 |
| 6,223,343 | B1 * | 4/2001 | Hopwood et al. ............. | 717/122 |
| 6,393,437 | B1 * | 5/2002 | Zinda et al. .................... | 717/124 |
| 6,601,233 | B1 * | 7/2003 | Underwood ................... | 717/103 |
| 6,917,950 | B2 * | 7/2005 | Mcbride et al. ..................... | 1/1 |
| 6,934,931 | B2 * | 8/2005 | Plumer et al. ................. | 717/106 |
| 7,251,669 | B1 * | 7/2007 | Arora ............................. | 707/695 |
| 7,277,901 | B2 * | 10/2007 | Parker et al. .......................... | 1/1 |
| 7,296,053 | B2 * | 11/2007 | Abdulhayoglu ............... | 709/203 |
| 7,503,034 | B2 * | 3/2009 | Berg et al. ..................... | 717/120 |
| 7,512,932 | B2 * | 3/2009 | Davidov et al. ............... | 717/106 |
| 7,526,759 | B2 * | 4/2009 | Sanjar et al. ................... | 717/103 |
| 7,539,976 | B1 * | 5/2009 | Ousterhout et al. ........... | 717/122 |
| 7,565,647 | B2 * | 7/2009 | Davidov et al. ............... | 717/106 |
| 7,676,788 | B1 * | 3/2010 | Ousterhout et al. ........... | 717/106 |
| 7,797,678 | B2 * | 9/2010 | Moulckers et al. ............. | 717/106 |
| 7,870,535 | B2 * | 1/2011 | Rippert et al. ................. | 717/103 |
| 8,069,433 | B2 * | 11/2011 | Parsell et al. .................. | 717/103 |
| 2002/0026630 | A1 * | 2/2002 | Schmidt et al. ............... | 717/103 |
| 2005/0022156 | A1 * | 1/2005 | Schwan et al. ................ | 717/122 |
| 2005/0044531 | A1 * | 2/2005 | Chawla et al. ................. | 717/122 |
| 2009/0300580 | A1 * | 12/2009 | Heyhoe et al. ................. | 717/122 |

OTHER PUBLICATIONS

Nagel, "Subversion Version Control", 2005 Prentice Hall; [retrieved on Jan. 30, 2012]; Retrieved from Internet <URL:http://ptgmedia.pearsoncmg.com/images/0131855182/downloads/Nagelbook.pdf>; pp. 1-343.*

Luo, et al., "Ariadne: An Eclipse-based system for tracking the originality of source code", IBM Systems Journal, 2007; [retrieved on Mar. 30, 2012]; Retrieved from Internet <URL:http://ieeexplore.ieee.org/stamp/stamp.jsp?tp=&arnumber=5386615>; pp. 289-303.*

(Continued)

*Primary Examiner* — Thuy Dao
*Assistant Examiner* — Xi D Chen (57) ABSTRACT

A system is provided comprising a computer and application that creates a development zone in response to a first message. The zone comprises a recording of state-based references to files and folders of a master production build in read-only and read-write copies of the build. The system receives another message containing a request to commit changes to the build. The changes comprise updating the build with changes to the read-write clone. The system compares the read-only snapshot with the current build to determine changes committed after the zone creation. The system compares changes to the read-write clone and changes committed to the build after zone creation. The system identifies files and folders changed in the read-write clone and commits the changes made to the read-write clone to a staging build and the master production build.

19 Claims, 4 Drawing Sheets

OTHER PUBLICATIONS

Abeysinghe, "PHP Team Development", Packet Publishing Packet, 2009;[retrieved on Mar. 30, 2012]; Retrieved from Internet <URL:http://www.bnn.go.id/portal/.../lelang-pekerjann-dokumens.pdf>; pp. 1-169.*

McIntosh, "Studying the Evolution of Bu8ild Systems", Quen's University, School of Computing, 2011; [retrieved on Mar. 30, 2012]; Retrieved from Internet <URL:http://sail.cs.queensu.ca/publications/pubs/masterthesis2011_mcintosh.pdf>; pp. 1-102.*

* cited by examiner

INDEPENDENT SOFTWARE DEVELOPMENT ZONES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large software development projects involve complex processes. Software developers and development teams may find it difficult to work on the same portion of code simultaneously. Providing a full and current copy of a software project to a developer's work environment may be time consuming and complicated as enterprise software projects are often large and constantly changing. A developer may find it difficult to remain current on recent changes to the project made by other developers or teams. Submitting, testing, and committing changes in a large development environment also presents challenges as a developer may not always know what changes other developers are making and submitting to a test environment. A developer may submit updated code to a test or staging server only to discover that changes the developer made are obviated or superseded by changes to related or dependent code submitted by other developers in the interim period. Resolution of conflicts arising from two or more developers changing the same code simultaneously adversely affects developer productivity. Testing of software changes in a large project may take an extended period and produce unexpected or unreliable results.

SUMMARY

In an embodiment, a system for building and using software development environments is provided. The system comprises an at least one computer system and an independent development zones application, that when executed on the at least one computer system, creates a development zone in response to a request received in a first message, the development zone comprising a recording of state-based references to files and folders of a master production build in a read-only snapshot of the master production build and a read-write clone of the master production build. The system also receives a second message containing a request to commit changes to the master production build, the changes comprising updating the master production build with changes made to the read-write clone of the master production build. The system also compares the read-only snapshot of the master production build with the current master production build to determine changes committed to the master production build subsequent to the creation of the development zone. The system also compares changes made to the read-write clone of the master production build and changes committed to the master production build subsequent to the creation of the development zone. The system also identifies individual files and folders both changed in the read-write clone of the master production build and changed and committed to the master production build subsequent to the creation of the read-write clone of the master production build and commits the changes made to the read-write clone of the master production build to a staging build and the master production build.

In another embodiment, a method of building and using software development environments is provided. The method comprises establishing a development zone in response to a request received from a first client device, the development zone comprising a recording of state-based references to files and folders of a master production build in a read-only virtual copy the master production build and a read-write virtual copy of the master production build. The method also comprises recording changes to files and folders of the master production build in existence at the time of creation of the development zone made by the first client device and recording creations of new files in the read-write virtual copy of the master production build made by the first client device. The method also comprises receiving a request from the first client device to commit changes to the master production build and adding to the read-write virtual copy of the master production build changes committed to the master production build by a second client device subsequent to the creation of the development zone. The method also comprises identifying individual files and folders of the master production build in existence at the creation of the development zone subsequently changed by the first client device and also changed by the second client device subsequent to the establishment of the development zone and committed by the second client device to the master production build. The method also comprises notifying the first client device of potential conflicts arising from individual files receiving changes from both the first client device and the second client device subsequent to the establishment of the development zone and committed by the second client device to the master production build and testing changes committed by the first client device and pushing the changes to the master production build.

In another embodiment, a method of building and using software development environments is provided. The method comprises creating a first independent development zone in response to a request from a first client device, the development zone comprising a recording of state-based references to files and folders of a master production build in a read-only virtual copy the master production build and a read-write virtual copy of the master production build. The method also comprises creating a second independent development zone in response to a request from a second client device, the second development zone comprising a recording of state-based references to files and folders of the master production build in a read-only virtual copy the master production build and a read-write virtual copy of the master production build. The method also comprises testing and committing the changes made in the first independent development zone and pushing the changes to the master production build in response to a request from the first client device. The method also comprises receiving a request from the second client device to commit the changes made in the second independent development zone and locking the master production build and a staging build. The method also comprises comparing the read-only virtual copy of the master production build created for the second independent development zone with the current master production build to determine changes originated in the first independent development zone and committed to the system subsequent to the creation of the second independent development zone. The method also comprises copying the changes committed to the master production build by the first independent development zone into the second independent development zone. The method also comprises sending a message to the second client device, the message instructing the second client device to resolve conflicts arising from individual files receiving changes in both the first independent development zone and in the second independent development zone subsequent to the creation of the second independent development zone. The method also comprises testing the changes made in the second independent development zone on the staging build, pushing the changes to the master production build, and unlocking the master production build in response to a request from the second client device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a system for independent software development zones permit a software developer to request and rapidly receive a virtual copy of a master production build accessible exclusively by the developer, to make code changes in the virtual copy, and to commit changes made to the virtual copy to the master production build. The system allows current virtual copies of the master production build to be produced upon developer request by generating a snapshot or replica of the master production build. The snapshot or replica is a complete record taken at a moment in time of the status of files in the master production build. Changes to the developer's virtual copy comprise state-based references to the master production build. The system tracks changes made to individual files by the developer in the virtual copy created for the developer. When the developer makes changes to a file, the system notes only the identity of the specific file changed and the changes made to the file. The copy of the master production build receiving code changes is virtual because it is not truly a copy, rather a record of changes only to individual files made by the developer. When the developer commits code changes, a staging server receives the files that received changes by the developer since the virtual copy was generated. The economy of action in this process permits efficiency and speed in providing the developer with the requested virtual copy when it is created and in testing and committing the developer's code changes when the developer completes that phase of work.

A development zone is created when a developer requests a current virtual copy of the master production build to write new software code to be added to the master production build and change and delete previously existing software code in the master production build. Only the developer given permission to make changes in a development zone may do so. Two or more development zones may exist concurrently. Development zones operate independently of each other. Development zones are isolated from the master production build and a developer's code changes are not committed to the master production build until the developer's changes are tested in the developer's development zone. After testing, the developer may then commit the changes to a staging build located on a staging server. The staging build is substantially identical to the master production build.

The system creates a read-only virtual copy and a read-write virtual copy of the master production build in the development zone created for the developer. The read-write virtual copy is used for the developer to make code changes. The read-only virtual copy is used to keep a record of the master production build's exact status at the time the development zone was created. When a developer completes a phase of code development and wishes to commit the newly developed code to the master production build, the read-only virtual copy is compared to the current master production build to determine changes committed to the master production build subsequent to the creation of the developer's zone. This comparison determines changes committed to the master production build by developers other than the subject developer since the subject developer's zone was created. Changes found to have been committed by other developers since creation of the subject developer's zone are furnished to the subject developer's development zone and those changes are combined with the developer's read-write virtual copy. The subject developer then has a fully current replica of the master production build combined with the subject developer's own changes. If the subject developer and other developers have made changes to one or more of the same individual files during the time the subject developer's development zone has been in effect, the subject developer will be prompted to examine and resolve those individual file conflicts before the system will accept, test, and eventually commit the subject developer's current changes into the master production build.

In addition to the master production build that is the master version of the software project, the system also comprises a staging build running on the staging server that is a working copy of the master production build. Changes committed by development zones are first copied to the staging build. The staging build receives changes submitted by only one development zone at a time so as to not mix code changes submitted by different development zones. While the system is comparing files submitted by a development zone to determine changes and the staging build is processing submitted changes, the system is in effect locked and temporarily does not permit other development zones to submit changes nor does it permit new development zones to be created. Once the process of reviewing and processing submitted changes on the staging build is complete and the submitted code is determined to be acceptable, the changes are committed to the staging build. At that moment the staging build and the master production build are running different versions of the project's software code. The staging server then pushes the new code changes in the staging build to the master production build to synchronize the two builds. Upon synchronization, the development zone that submitted the changes may be ended and the subject developer and other developers may then request new development zones to begin new phases of their work. In addition, other existing development zones may then begin the process of committing their changes since the master production build is fully updated and the staging build stands ready to accept new code submissions.

The system for independent development zones permits multiple software development zones to operate concurrently and independently and work on the same portions of code simultaneously. By accepting changes from only one development zone at a time and not creating new development zones until the received set of code changes are fully tested and committed, the system holds the production environment static to eliminate confusion that could result from changes being tested and committed from more than one development zone. The master production build is not changed until the changes have been tested and determined to be functionally acceptable on the staging build. When the master production build receives finalized changes and is hence synchronized with the staging build, the master production build is then unlocked. The master production build may then be drawn upon for fully updated and current virtual copies for the creation of new development zones and currently existing development zones may seek to commit their code changes.

Figure 1:
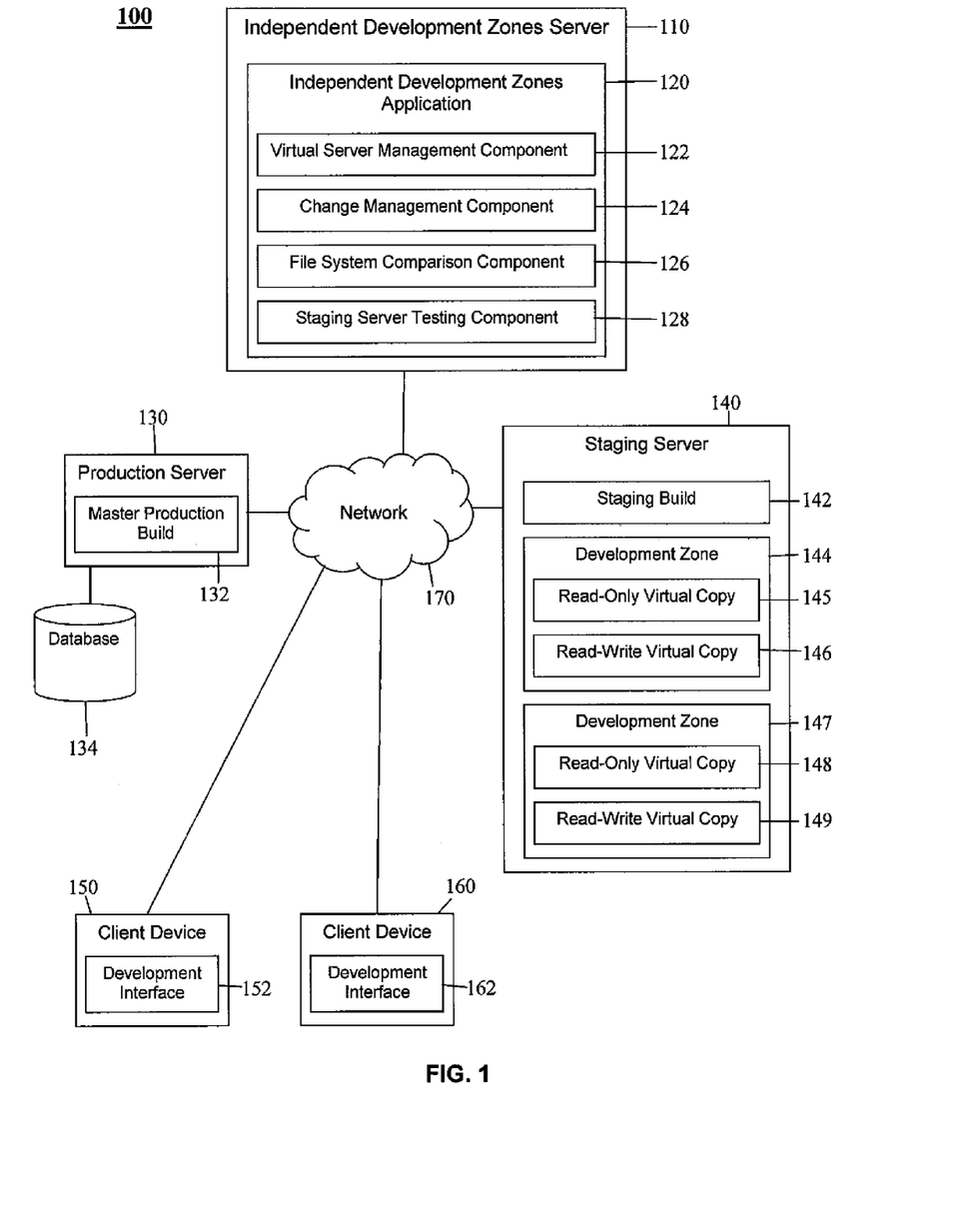
FIG. 1 is a block diagram of a system according to an embodiment of the disclosure.

Turning now to FIG. 1, a system 100 for independent development zones is provided. The system comprises an independent development zones server 110, an independent development zones application 120, a production server 130, a master production build 132, a database 134, a staging server 140, a staging build 142, a client device 150, and a network 170. In some embodiments, additional client devices 160 will be present and active in the system 100. Attributes and functionality of the client device 150 may be taken to be representative of the additional client devices 160. In some contexts the client device 150 may be referred to as the first client device 150 and in some contexts the client device 160 may be referred to as the second client device 160.

The independent development zones server 110 may be any general purpose computer system, as discussed in greater detail hereinafter. The independent development zones server 110 may comprise one computer or a plurality of computers, for example a server farm wherein many server computers cooperate to share a processing load. The independent development zones server 110 may comprise a plurality of computers that are located at different places, for example to provide geographical diversity and increased service reliability. The independent development zones server 110 executes one or more applications that provide services to at least one of the client devices 150 including hosting of the independent development zones application 120.

The independent development zones application 120 executes on the independent development zones server 110 and provides a variety of software development services to the client devices 150. The independent development zones application 120 receives messages from the client devices 150 and the staging server 140 about development zones, code changes to files in development zones, the testing and committing of changes to the staging build 142, and the pushing of committed changes by the staging server 140 to the master production build 132 on the production server 130. The independent development zones application 120 comprises a virtual server management component 122 that creates development zones upon request of the client device 150. Establishing a new development zone comprises creating both a read-only virtual copy of the master production build 132 and a read-write virtual copy of the master production build 132. In some embodiments, read-only virtual copies may be referred to as snapshots and read-write virtual copies may be referred to as clones. These virtual copies are created by the virtual server management component 122 creating the snapshot or clone that is the listing of state-based references to files in the master production build 132 at the time the virtual copies are instantiated. The read-only virtual copy and the read-write virtual copy of the master production build 132 are placed into the newly created development zone and the read-write virtual copy is then ready to receive code changes from the client device 150. The virtual server management component 122 also terminates development zones when their code changes have been tested and committed by the staging server 140 and the changes have been pushed to the master production build 132.

State-based references comprise the recording of the date stamp and timestamp of files, folders, and other software elements that comprise the master production build 132. The record of the date stamps and timestamps at the time the development zone is created comprises a baseline of the master production build 132. Changes made to files, folders, and any other software elements of the read-write virtual copy of the master production build 132 are recorded. When a client device 150 seeks to commit its code changes made in its read-write virtual copy, the independent development zones application 120 examines the read-write virtual copy that is a listing of the changes made by the client device 150. The changed state of the read-write virtual copy is examined in conjunction with the read-only virtual copy as well as the current state of the master production build 132 at commit time to identify potential file conflicts and test and commit changes made by the client device 150 in the read-write virtual copy.

Virtual development environments allow software developers to create a plurality of customized server and database configurations in which they may develop and test new code. Physical servers may be partitioned into multiple virtual servers such that each instance has the appearance of running in its own physical environment. Some file systems that support virtual development environments use a copy-on-write transactional object model that provides the advantage of allowing snapshot versions of the file system to be maintained even when new data is written. Such file systems, for example the Zettabyte File System (ZFS) used on the SOLARIS operating system, allow a clone or snapshot of version of the file system to be maintained. ZFS and SOLARIS are trademarks of Sun Microsystems, Inc. Snapshots may be created very quickly, since all the data composing the snapshot is already stored. Snapshots may be very space efficient, since any unchanged data is shared among the file system and its snapshots. Writeable snapshots or clones may also be created, resulting in multiple independent file systems that share a set of memory blocks. As changes are made to any of the cloned file systems, new data blocks are created to reflect those changes, but any unchanged blocks may continue to be shared, regardless of how many clones are in existence.

The independent development zones application 120 also includes the change management component 124 that evaluates code changes to individual files committed to the staging server 140 by development zones. When the independent development zones application 120 receives a request from a client device 150 to commit changes made in a development zone, the change management component 124 locks the master production build 132 until the changes committed are fully tested, found to be acceptable, committed to the staging build 142, and pushed to the master production build 132. While multiple steps are involved, this process may take only seconds and may not be noticeable by other client devices 160. The change management component 124 copies changes committed by other developers subsequent to the creation of the subject development zone into the read-write virtual copy of the master production build 132 when the client device 150 initiates the process of committing its changes and closing out its development zone.

The change management component 124 advises the client device 150 when file conflicts exist arising from individual files having received alterations from both the client device 150 during the current development zone and committed by other client devices 160 from other development zones after the creation of the subject development zone. The change management component 124 prompts the client device 150 to resolve file conflicts when they occur and prevents further committing of changes until file conflicts are resolved. The change management component 124 commits changes to the staging build 142 once the changes have been tested on the staging build 142. The change management component 124 oversees the pushing of committed changes from the staging build 142 to the master production build 132 to bring the two builds back into synchronization. The change management component 124 finally unlocks the master production build 132 and the staging build 142 when synchronization is complete.

The independent development zones application 120 also comprises the file system comparison component 126 that is used by the change management component 124 to identify files that have been changed by the client device 150 in its read-write virtual copy of the master production build 132. When the client device 150 contacts the independent development zones application 120 to begin the process of testing and committing the code changes it has made in its development zone, the change management component 124 directs the file system comparison component 126 to compare the read-write and read-only copies of the master production build 132 to determine changes made to individual files in the development zone by the client device 150.

The file system comparison component 126 examines the date stamp and timestamps of all files and folders listed in the read-only copy and compares that information with the date stamps and timestamps of the files listed in the read-write copy. The file system comparison component 126 notes the files and folders wherein the date stamps and timestamps differ, indicating that changes have been made. The file system comparison component 126 also makes note of newly created files and folders appearing in the read-write copy. The file system comparison component 126 finally notes files and folders appearing in the read-only copy that are not included in the read-write copy, indicating that those files and/or folders have been deleted. The file system comparison component 126 compiles a listing of these changed, new, and deleted files and/or folders and furnishes the listing to the change management component 124.

The independent development zones application 120 also comprises the staging server testing component 128 that may test the changed files on the staging build 142 before the change management component 124 commits the changes to the staging build 142. While much testing of code changes may be performed within a development zone by a developer before the staging server testing component 128 is engaged, in some embodiments, the staging server testing component 128 may create additional test builds or instances of the staging build 142 to be tested in closed environments with various code combinations or under various load conditions. The staging server testing component 128 may subject the staging build 142 or testing instances of the staging build 142 to tests mandated by the system 100 to make certain that the code changes provided by the client device 150 from the development zone are functioning as intended.

The master production build 132 is the master version of a software project in the system 100 and resides in the production server 130. The master production build 132 is accessible for code changes after the staging server 140 has received, tested, and committed changes from a development zone on the staging build 142 and the staging server 140 pushes the committed changes to the master production build 132, thereby synchronizing the master production build 132 and the staging build 142. The change management component 124 conducts the pushing of the code changes committed to the staging build 142 to the production server 130 for synchronizing with the master production build 132. The master production build 132 is also used by the virtual server management component 122 for snapshotting and cloning for creation of virtual copies when development zones are being created. During the period when code changes made in a development zone are being processed and possibly tested on the staging build 142, being committed to the staging build 142, and being pushed to the master production build 132, the staging server 140, the production server 130 and the master production build 132 are effectively locked by the independent development zones application 120. During this period, code changes from development zones other than the subject development zone whose code changes are currently being tested may not be committed. During this period, the master production build 132 is not available for creation of virtual copies as the master production build 132 will likely be shortly receiving code changes from and synchronizing with the staging build 142.

The database 134 is associated with the production server 130 and may house the master production build 132. The master production build 132 may or may not be a database application. When the staging build 142 pushes changes to the master production build 132 and the master production build 132 is a database application housed in the database 134, the production server 130 will receive the pushed changes and forward them on to the master production build 132 in the database 134. The system 100 may also include backup capability or fault tolerant protection for the production server 130 using disk mirroring, redundant array of inexpensive disk (RAID), or other technologies physically within the production server 130 or in external devices.

The staging build 142 is a working copy of the master production build 132 and is maintained on the staging server 140. Since the master production build 132 is the final and fully tested master version of the software project and should be isolated from contact with development activities, the staging server 140 hosts one or more copies of the master production build 132 used by the staging server 140 for testing and committing software code changes submitted by client devices 150 from development zones. The staging build 142 is the working copy of the master production build 132. Other than during periods when the staging server 140 is testing and committing changes and pushing the changes to the master production build 132, the staging build 142 and the master production build 132 are substantially identical. In an embodiment, the staging server 140 may create copies of the staging build 142 and maintain the copies in isolated environments for the staging server testing component 128 to use in testing software changes received from development zones.

The staging server 140 also hosts the development zones 144, 147 used by client devices 150, 160 for changing and deleting existing files and adding new files to the read-write virtual copies of the master production build 132 created and provided by the virtual server management component 122. Each development zone 144, 147 contains one read-only virtual copy 145, 148 and one read-write virtual copy 146, 149, respectively, of the master production build 132. The development zones 144, 147 are fully functioning virtual server environments that may include an operating system, database, and applications. A developer may be able to perform the majority of testing within the development zone 144, 147 prior to committing changes to the staging server 140. A developer may make changes in a development zone 144, 147, test the changes, and be able to see the effect of the changes almost immediately. The development zones 144, 147 may reside on the staging server 140 instead of on the client devices 150, 160 to permit the system 100 greater control over the development zones 144, 147 and make more efficient use of network resources. One or more client devices 150, 160 are assigned to work in each development zone 144, 147 in accordance with the project goals for each development zone 144, 147. The client devices 150, 160 are provided permissions to log into and make changes to the individual read-write virtual copies 146, 149 in the particular development zone 144, 147 to which the client device 150 is assigned. In an embodiment, a client device 150 may be authorized to work in more than one development zone 144, 147 at a time. In another embodiment, two or more client devices 150, 160 may be assigned to work in a single development zone 144, 147. The development zones 144, 147 are seen by the client device 150 as writeable versions of the master production build 132 in the system 100. Each development zone 144, 147 has network addressing and is protected by network security with permissions required for the assigned client device 150 to log into the development zone 144, 147 and make changes. In an embodiment, the independent development zones server 110, the production server 130, the staging server 140, or combinations thereof may reside on the same physical computer. In an embodiment, the development zones 144, 147 may reside in storage media attached to but physically separate from the staging server 140.

The client device 150, 160 is the component used by software developers to enter software code additions, deletions, and other changes to the read-write virtual copy 146, 149 in the development zone(s) 144, 147 to which the client device 150, 160 is assigned. The client device 150, 160 may be a general purpose computer and/or workstation. The client device 150, 160 communicates with the staging server 140, enters credentials, and is provided access to its particular assigned development zone 144, 147. The client device 150, 160 comprises a development interface 152, 162 that the client device 150, 160 uses to view and make changes to the read-write virtual copy 146, 149 in its development zone 144, 147. In an embodiment, the development interface 152, 162 may be a web browser or other client software installed on the client device 150, 160. In an embodiment, the client device 150, 160 may access its development zone 144, 147 by entering a uniform resource locator (URL) in its web browser followed by credentials to access its development zone 144, 147.

Regardless of which client devices 150, 160 are singularly or collectively assigned to and provided permission to make changes in which development zones 144, 147, the staging server 140 under the direction of the change management component 124 deals with only one development zone 144, 147 at a time in receiving, testing, and committing code changes.

The network 170 promotes communication between the components of the system 100. The network 170 may be any communication network including a public data network (PDN), a public switched telephone network (PSTN), a private network, and/or a combination thereof.

Figure 2:
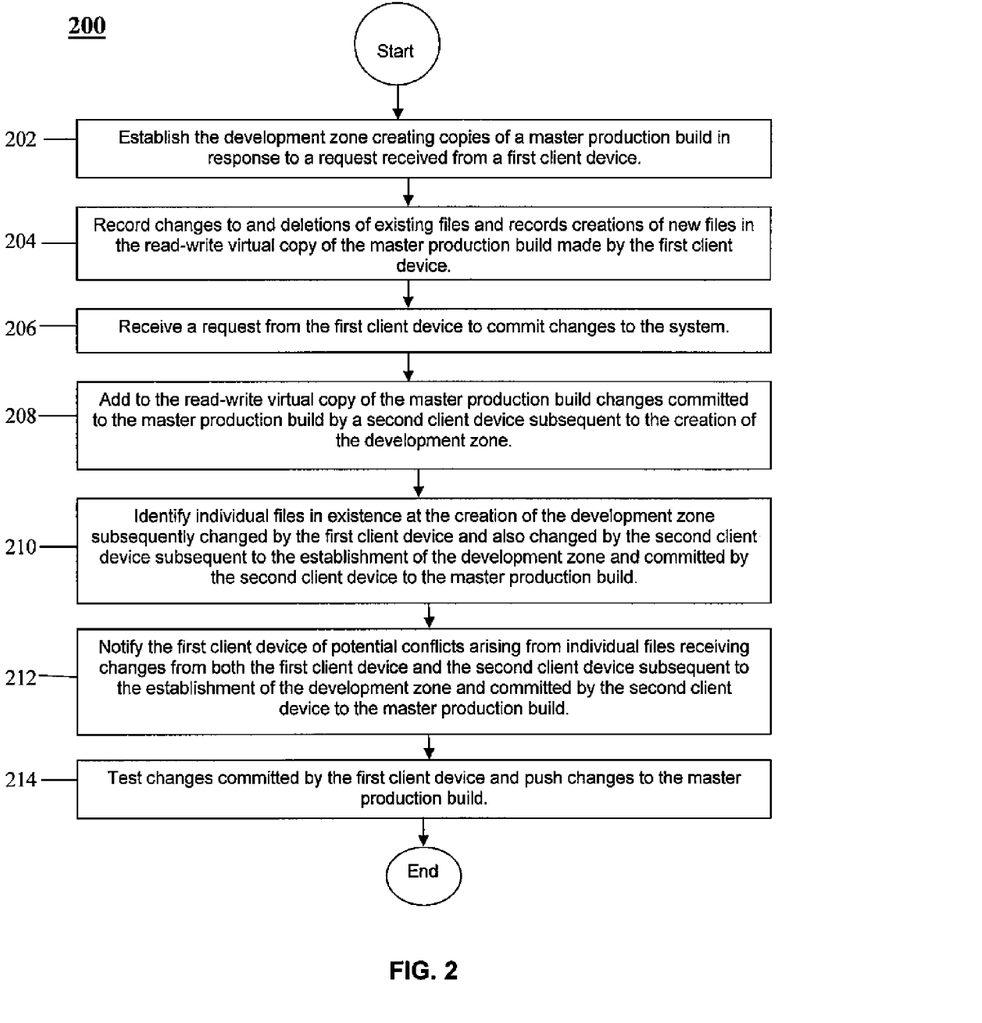
FIG. 2 is a flow chart illustrating a method according to an embodiment of the disclosure.

Turning now to FIG. 2, a method 200 of building and using software development environments is provided. Beginning at block 202, the independent development zones application 120 receives a request from a first client device 150 to establish a development zone 144. The first client device 150 may be assigned to a software developer or team of software developers beginning work on a new section of code within a large enterprise software project. The master copy of the project is stored on the production server 130 as the master production build 132 and a working copy of the master production build 132 is maintained on the staging server 140 as the staging build 142.

At block 202, the virtual server management component 122 establishes a first development zone 144 in response to the request, creates a read-only virtual copy 145 and a read-write virtual copy 146 of the master production build 132 and assigns the read-only virtual copy 145 and the read-write virtual copy 146 to the first development zone 144. The independent development zones application 120 creates a date stamp and timestamp record of all of the files and folders in the master production build 132 and stands ready to make notations of any files that are changed or deleted as well as mark new files and folders that are added by the client device 150 while the first development zone 144 is in effect.

At block 202, the virtual server management component 122 also assigns network addressing to the first development zone 144, creates permissions on the staging server 140 enabling the client device 150 to be able to log into and make changes to the read-write virtual copy 146, and communicates the necessary network credentials to the client 150. In an embodiment, the virtual server management component 122 may create credentials for other client devices 150 to access the first development zone 144. In an embodiment, secondary levels of permissions may be created to permit other client devices 150, for example supervisors, customers, or outside contractors, to have read-only access to selected portions of the first development zone 144 but be unable to alter or add software code in the read-write virtual copy 146.

At block 204, the change management component 124 records changes to and deletions of existing files and records creations of new files in the read-write virtual copy 146 made by client device 150. This is the normal operating activity of the system 100 while the first development zone 144 is in effect and client device 150 is working on the software code in the read-write virtual copy 146.

At block 206, the independent development zones application 120 receives a message from the client device 150 containing a request to commit changes to the master production build 132. The client device 150 is indicating that it is finished its work in the first development zone 144 and wishes to have its changes to the read-write virtual copy 146 submitted to the staging build 142 and eventually committed to the master production build 132. The independent development zones application 120 compares the read-only virtual copy 145 created when the first development zone 144 was established to the current master production build 132. This process identifies files changed and committed by developers other than the client 150 working in other development zones 147 subsequent to the creation of the first development zone 144. Because the creation of a development zone 144, 147 takes copies of the master production build 132 at a moment in time and isolates the copies in a development environment, the client device 150 making code changes in the environment cannot know about changes committed to the master production build 132 since the development zone 144, 147 was created. When the independent development zones application 120 compares the read-only virtual copy 145 with the master production build 132 as it stands when the client device 150 indicates it has finished its work and is ready to close out its first development zone 144, the comparison will yield the changes made by other developers during the time the first development zone 144 was in effect. At block 208, the independent development zones application 120 combines those changes with changes made by the client device 150 in the read-write virtual copy 146. The file system comparison component 126 is used to examine files and folders in the read-write virtual copy 146 and determine which files were changed and deleted and if any new files were created and added to the read-write virtual copy 146.

At block 210, the change management component 124 determines if any individual files or folders have been changed by both the client device 150 and client device 160 other than the client device 150 since the first development zone 144 was created. Since the client device 150 has been working in the isolated development environment of the first development zone 144, the client device 150 may not know that the client device 150 and another client device 160 have simultaneously been making changes to the same individual file. In an embodiment, there may be communication and coordination of activities between software developers and development teams to provide that this scenario does not occur, but the action of the system 100 at block 210 may identify these situations when they do occur.

At block 212, the change management component 124 notifies the client device 150 of file conflicts discovered at block 210 and instructs the client device 150 to make additional changes to the read-write virtual copy 146 to resolve these conflicts. Resolving file conflicts may require the approval or confirmation of the other developer or development team that made changes to the conflicting file or files. Upon completing this task, the client device 150 then indicates to the change management component 124 that its read-write virtual copy 146 is ready to have the code changes therein reviewed and possibly tested by the staging server 140 in the staging build 142 and committed to the master production build 132.

At block 214, the change management component 124 receives the final code changes from the client device 150. The staging server testing component 128 may test the code changes on the staging build 142 or a copy of the staging build 142 in an isolated test environment created to subject the code changes to testing in addition to the testing performed earlier by the client device 150. In the isolated test environment the staging server testing component 128 may subject the code furnished by the client device 150 to various additional test procedures under differing load scenarios and other conditions. The test conditions may be specific to the policies and objectives of the overall software project in the system 100. When any additional testing of the code changes performed by the staging server testing component 128 is complete and the submitted code is determined to be safe and also satisfactory in terms of achieving intended functionality, design, and system resource usage objectives, the code changes are committed to the staging build 142. The virtual server management component 122 may delete the first development zone 144 as its code changes have been fully accepted. At this moment the staging build 142 and the master production build 132 are running different versions of the software project code and must be synchronized.

Continuing at block 214, the independent development zones application 120 pushes the code changes committed by the staging build 142 along to the master production build 132 to bring the two components back into synchronization. The file system comparison component 126 may run tests on the staging build 142 and the master production build 132 to make certain that the master production build 132 has fully incorporated the newly committed changes. At this point the master production build 132 is then fully updated and the master production build 132 is once again available for the virtual server management component 122 to create new development zones 144, 147 upon request of client devices 150, 160. The staging server 140 is also available for other development zones 144, 147 to initiate the process of committing their code changes when they so choose.

Figure 3:
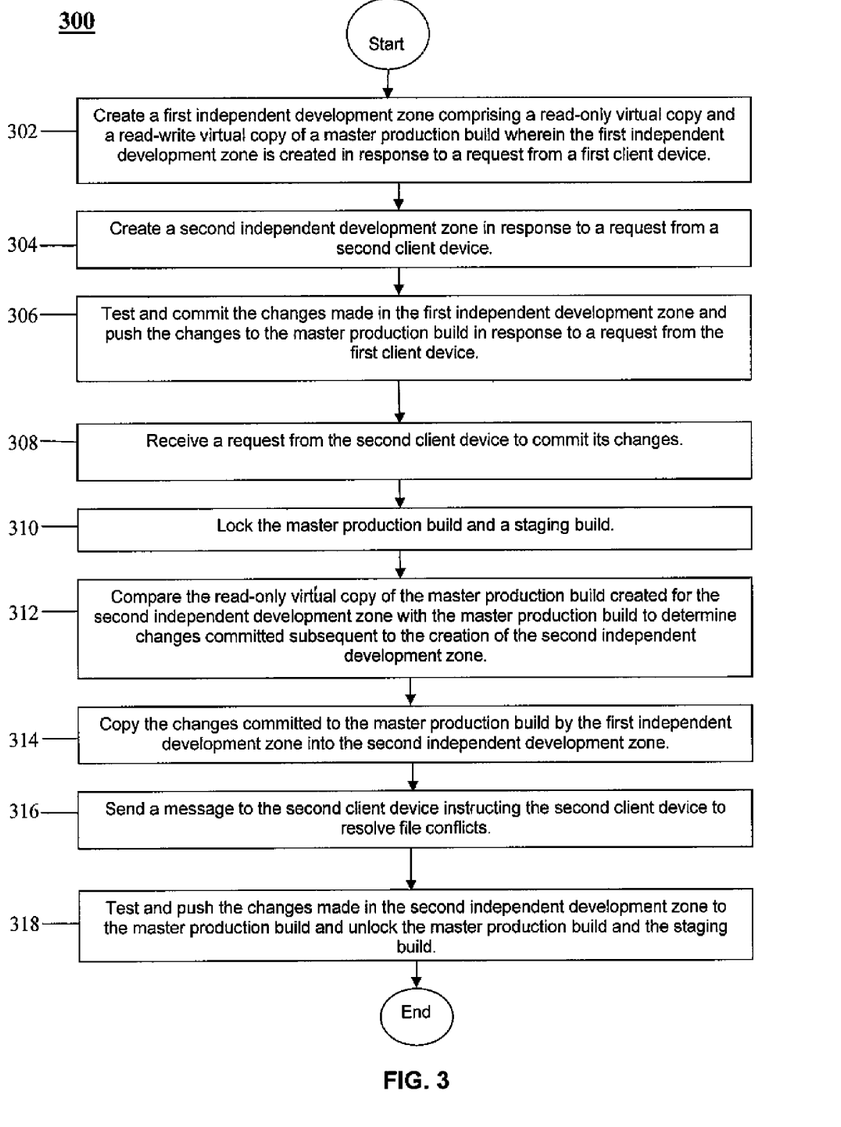
FIG. 3 is a flow chart illustrating another method according to an embodiment of the disclosure.

Turning now to FIG. 3, a method 300 of building and using software development environments is provided. At block 302, the virtual server management component 122 creates a first development zone 144 on the staging server 140 upon receiving a request from the first client device 150. The virtual server management component 122 then copies the master production build 132 by taking a date and time snapshot and clone of the file system of the master production build 132, creating a read-only virtual copy 145 and a read-write virtual copy 146, respectively, and associating the copies with the first development zone 144.

At block 304, the virtual server management component 122 receives a request from a second client device 160 to establish a second development zone 147. As with its actions at block 302, the virtual server management component 122 again copies the master production build 132 by taking a date and time snapshot and clone of the file system of the master production build 132 and at block 304 creates a read-only virtual copy 148 and a read-write virtual copy 149, and associating the copies with the second development zone 147.

At block 306, after a time period the independent development zones application 120 receives a request from the first client device 150 to commit changes made in the first development zone 144. As in the method 200, the independent development zones application 120 temporarily locks the master production build 132 and the staging build 142, commits the code changes found in the read-write virtual copy 146, pushes the changes to the master production build 132 to resynchronize the staging build 142 and the master production build 132. The independent development zones application 120 then unlocks the updated and resynchronized master production build 132 making it available for the second client device 160 to commit its changes and the first client device 150 to request another instance of the first development zone 144 to begin work again should those components take these actions.

At block 308, at a point after the conclusion of events at block 306, the independent development zones application 120 receives a request from the second client device 160 to commit changes made in the second development zone 147. At block 310, the master production build 132 and staging build 142 are again locked and at block 312 the file system comparison component 126 compares the read-only virtual copy 148 in the second development zone 147 to the current file system of the master production build 132. This action generates a listing of files and in the master production build 132 that have been changed, added, or deleted in the master production build 132 since the creation of the second development zone 147. This listing includes the changes committed to the master production build 132 by the first client device 150 at block 306. The second development zone 147 would not be aware of those changes, as it was created prior to the committing of those changes by the first client device 150, and the system 100 does not enable communication or sharing of content between development zones 144, 147.

At block 314, the independent development zones application 120 copies the changes found at block 310 into the read-write virtual copy 149 in the second development zone 147. This action combines all of the changes made by the second client device 160 in the second development zone 147 with any changes committed to the master production build 132 by other client devices 150 since the second development zone 147 was created. The change management component 124 and the file system comparison component 126 will compare the date stamps and timestamps on all of the files and folders changed, added, or deleted by these two sources to identify any instances in which one or more individual files were altered in any manner by both the second client device 160 and the first client device 150 or any other party subsequent to the creation of the second development zone 147. In this event, file conflicts exist that must be resolved before code changes made in the second development zone 147 may be accepted, subject to any additional testing, and committed by the staging server 140.

As a more comprehensive alternative to the steps described at block 314, the independent development zones application 120 may archive the changes found in the read-write virtual copy 149 of the second development zone 147, delete the second development zone 147, and create a third development zone 144, 147 that contains code changes committed to the master production build 132 since the second development zone 147 was created. The archived changes from the second development zone 147 are then added into the new third development zone with the second client device 160 given responsibility to resolve any file conflicts before the code changes made by the second client device 160 may be tested and committed on the staging server 140. This alternative may allow the second client device 160 to continue its work in the new third development zone with minimal interruption to the second client device 160 and without the need to lock the production server 130 and staging server 140 and potentially create delay for other developers or development teams. The second client device 160 resumes its work with its new third development zone containing all current code from the production instance 132 as well as all current code changes made by the second client device 160. This express alternative to the steps in block 314 may improve overall efficiency in the development environment during periods of high activity. In an embodiment of this alternative to the steps described at block 314, the second development zone 147 may not be deleted at all and the incremental changes made to the production instance 132 by the first client device 150 and potentially other developers are copied into the second development zone 147 and the second client device 160 keeps working in its newly updated read-write copy 149 in the second development zone 147. At this time a new read-only virtual copy 148 would also need to be created and any file conflicts discovered by the second client device 160 before the second client device 160 could fully continue.

At block 316, the second client device 160 receives instruction from the independent development zones application 120 to resolve file conflicts arising from individual files receiving changes in both the second development zone 147 and by the first client device 150 and perhaps other parties subsequent to the creation of the second development zone 147. The process of resolving these file conflicts by the second client device 160 may involve merely accepting the files as they are presently committed in the master production build 132 as the differences between the conflicting versions of the files may not be material. The second client device 160 may alternatively need to make additional changes to its own code to adjust for the changes made after the second development zone 147 was created to resolve the conflicts. If file conflicts are serious and cannot be resolved by the second client device 160 accepting the other parties' changes or adjusting its code in the read-write virtual copy 149 in the second development zone 147, the second client device 160 may contact supervisors, project leaders, or perhaps even the client device 150 or other parties that made the code changes that gave rise to the file conflicts that the second client device 160 must resolve. Maintaining separation of development zones 144, 147 while they are in existence and testing and committing code changes from only one development zone 144, 147 at a time is helpful to reducing lost productivity due to file system conflicts when two or more development zones 144, 147 are working in sections of a software project wherein code may overlap.

At block 318, the independent development zones application 120 receives another message from the second client device 160 indicating that it has resolved the previously described file conflicts and wishes to commit its changes. As the staging server 140 will be reviewing and committing changes, the master production build 132 and the staging server 140 are effectively locked from attempts to commit changes by other client devices 150, 160 and attempts by the virtual server management component 122 to create new development zones 144, 147 until the code changes received from the second development zone 147 are reviewed, committed and pushed to the master production build 132.

At block 318, the changes developed by the second client device 160 in the second development zone 147 are received and potentially subjected to additional testing on the staging server 140 or in a test environment containing a working copy of the staging build 142. Assuming code review and any additional testing reveals that the changes have the intended effect in the software project, the changes are committed. The committed changes are pushed to the production server 130, the master production build 132 and staging build 142 are brought back into synchronization, and the lock on the master production build 132 is cleared.

Each time code changes are committed in the system 100, the master production build 132 is updated with the code changes, and the production server 130 and staging server 140 are resynchronized, a build number or other identifying designation is applied to the new server build of the software project. Records are maintained detailing the individual file changes and the date and time stamps applied to the newly changed or added files for each new build. Records for previous builds are also maintained. An integrated change log for each new build is also maintained containing a description of each file change, addition, and deletion committed in the new build.

Figure 4:
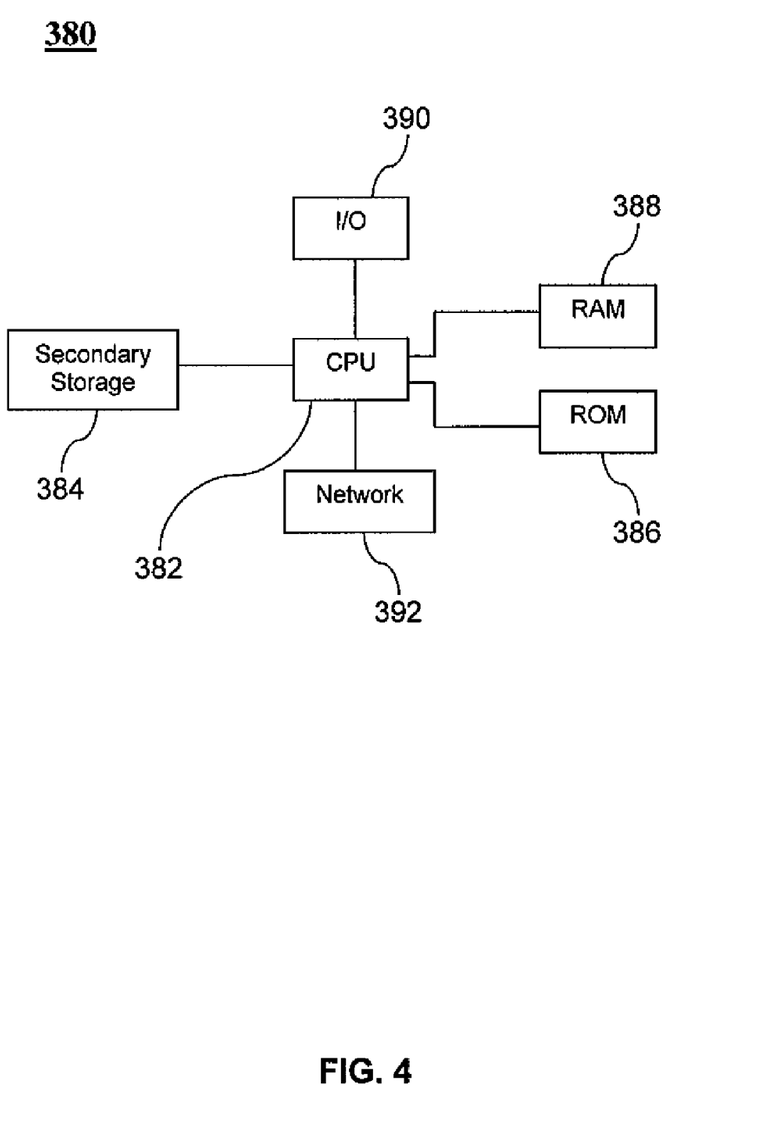
FIG. 4 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method executed by a processor of building and using software development environments, comprising:

establishing a development zone in response to a request received from a first client device, the development zone comprising a recording of state-based references to files and folders of a master production build in a read-only virtual copy of the master production build and a read-write virtual copy of the master production build, wherein the state-based references comprise the recording of a date stamp and timestamp of the files and folders of the master production build, and wherein the development zone is a virtual server environment residing on a staging server, recording changes to files and folders of the master production build in existence at the time of creation of the development zone made by the first client device and recording creations of new files in the read-write virtual copy of the master production build made by the first client device;

receiving a request from the first client device to commit changes to the master production build, the changes made by the first client device in the development zone;

adding to the read-write virtual copy of the master production build changes committed to the master production build by a second client device subsequent to the creation of the development zone;

identifying individual files and folders of the master production build in existence at the creation of the development zone subsequently changed by the first client device and also changed by the second client device subsequent to the establishment of the development zone and committed by the second client device to the master production build;

notifying the first client device of potential conflicts arising from individual files receiving changes from both the first client device and the second client device subsequent to the establishment of the development zone and committed by the second client device to the master production build; and testing changes committed by the first client device and pushing the changes to the master production build on a production server.

2. The method of claim 1, wherein the development zone is allocated network addressing and the first client device is provided credentials to permit access to development zones.

3. The method of claim 1, wherein a plurality of development zones reside on the staging server and the development zones operate concurrently and independently.

4. The method of claim 1, wherein the development zone contains a single read-write virtual copy and a single read-only virtual copy of the master production build.

5. The method of claim 3, wherein the plurality of development zones are maintained as separate virtual instances of the master production build and development zones do not interact with each other.

6. The method of claim 1, wherein changes committed by a client device from a development zone are tested and committed to the staging build in sequence.

7. The method of claim 3, wherein the plurality of development zones exist independent of client devices.

8. A method executed by a processor of building and using software development environments, comprising:
   creating a first independent development zone in response to a request from a first client device, the development zone comprising a recording of state-based references to files and folders of a master production build in a read-only virtual copy the master production build and a read-write virtual copy of the master production build, wherein the state-based references comprise the recording of a date stamp and timestamp of the files and folders of the master production build, and wherein the development zone is a virtual server environment residing on a staging server;
   creating a second independent development zone on the staging server in response to a request from a second client device, the second development zone comprising a recording of state-based references to files and folders of the master production build in a read-only virtual copy the master production build and a read-write virtual copy of the master production build;
   testing and committing the changes made in the first independent development zone by the first client device and pushing the changes to the master production build on a production server in response to a request from the first client device;
   receiving a request from the second client device to commit the changes made in the second independent development zone;
   locking the master production build and a staging build in response to receiving the request from the second client device to commit the changes made in the second independent development zone;
   comparing the read-only virtual copy of the master production build created for the second independent development zone with the current master production build to determine changes originated in the first independent development zone and committed to the system subsequent to the creation of the second independent development zone;
   copying the changes committed to the master production build by the first independent development zone into the second independent development zone;
   sending a message to the second client device, the message instructing the second client device to resolve conflicts arising from individual files receiving changes in both the first independent development zone and in the second independent development zone subsequent to the creation of the second independent development zone; and
   testing the changes made in the second independent development zone on the staging build on the staging server, pushing the changes to the master production build on the production server, and unlocking the master production build in response to a request from the second client device.

9. The method of claim 8, wherein locking the master production build and the staging build prevents new development zones from being created and prevents other development zones from committing changes while the changes made in the second development zone are being tested and committed.

10. The method of claim 9, wherein once changes committed by the second development zone have been tested on the staging build and have been determined by the second client device to be functioning as designed, the changes are pushed to the master production build and the master production build and the staging build are unlocked.

11. The method of claim 9, wherein once the master production build and the staging build are unlocked, the master production build is available for creation of new development zones and the staging build is available to receive commitments of file changes from development zones.

12. The method of claim 8, wherein each update of files and folders committed to the staging build and pushed to the master production build is marked with a build number and is recoverable.

13. The method of claim 8, wherein each update of files and folders committed to the staging build and pushed to the master production build comprises a description of the changes within, with the description logged with the build number assigned to the commitment.

14. A system for building and using software development environments, comprising:
   an at least one computer system, wherein the at least one computer system comprises one or more processors and one or more memory; and
   an independent development zones application, that when executed on the at least one computer system,
      creates a development zone in response to a request received in a first message from a client device, the development zone comprising a recording of state-based references to files and folders of a master production build in a read-only snapshot of the master production build and a read-write clone of the master production build, wherein the state-based references comprise the recording of a date stamp and timestamp of the files and folders of the master production build, and wherein the development zone is a virtual server environment residing on a staging server,
      receives a second message containing a request to commit changes to the master production build, the changes made by the client device in the development zone, and the changes comprising updating the master production build with changes made to the read-write clone of the master production build,
      compares the read-only snapshot of the master production build with the current master production build to determine changes committed to the master production build subsequent to the creation of the development zone,
      compares changes made to the read-write clone of the master production build and changes committed to the master production build subsequent to the creation of the development zone,
      identifies individual files and folders both changed in the read-write clone of the master production build and changed and committed to the master production build subsequent to the creation of the read-write clone of the master production build, and commits the changes made to the read-write clone of the master production build to a staging build on the staging server and the master production build on a production server.

15. The system of claim 14, wherein changes are committed to the staging build and are subsequently pushed to the master production build.

16. The system of claim 14, wherein the recording of changes to the read-write clone of the master production build comprises recording files and folders in the master production build that are at least one of added, deleted, and changed in the read-write clone.

17. The system of claim 14, wherein the development zone comprises a virtual copy of the master production build and changes to individual files are logged.

18. The system of claim 14, wherein changes to the read-write clone of the master production build are finalized and committed to the staging build after conflicts arising from individual files receiving changes in both the development zone and in the master production build subsequent to the creation of the development zone are resolved.

19. The system of claim 14, wherein the staging build tests changes made to files in the development zone and committed by the development zone to the staging server before accepting the changes and pushing the changes to the master production build.

* * * * *